US011560786B2

(12) United States Patent
Schaupp et al.

(10) Patent No.: US 11,560,786 B2
(45) Date of Patent: Jan. 24, 2023

(54) LIQUID LEVEL SENSOR SYSTEM

(71) Applicant: Q.E.D. Environmental Systems, Inc., Dexter, MI (US)

(72) Inventors: John F. Schaupp, Dexter, MI (US); David A. Fischer, Dexter, MI (US); Leonard Felton Stevens-Moman, Dexter, MI (US); William C. Allen, III, Dexter, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 184 days.

(21) Appl. No.: 16/756,876

(22) PCT Filed: Oct. 31, 2018

(86) PCT No.: PCT/US2018/058507
§ 371 (c)(1),
(2) Date: Apr. 17, 2020

(87) PCT Pub. No.: WO2019/089792
PCT Pub. Date: May 9, 2019

(65) Prior Publication Data
US 2021/0199001 A1    Jul. 1, 2021

Related U.S. Application Data

(60) Provisional application No. 62/580,750, filed on Nov. 2, 2017.

(51) Int. Cl.
*G01F 23/68* (2006.01)
*E21B 47/047* (2012.01)

(52) U.S. Cl.
CPC ............ *E21B 47/047* (2020.05); *G01F 23/68* (2013.01)

(58) Field of Classification Search
CPC ....... E21B 47/047; G01F 23/68; G01F 23/585
See application file for complete search history.

(56) References Cited

U.S. PATENT DOCUMENTS

| | | | | |
|---|---|---|---|---|
| 4,804,944 A * | 2/1989 | Golladay | ............. | G08B 21/182 |
| | | | | 250/900 |
| 5,099,920 A | 3/1992 | Warburton et al. | | |

(Continued)

FOREIGN PATENT DOCUMENTS

| | | |
|---|---|---|
| CA | 2762269 A2 | 5/2012 |
| CN | 102859115 A | 1/2013 |

(Continued)

OTHER PUBLICATIONS

Extended European Search Report regarding International Application No. 18874585.5, dated Mar. 1, 2021.

(Continued)

*Primary Examiner* — Lisa M Caputo
*Assistant Examiner* — Alex T Devito
(74) *Attorney, Agent, or Firm* — Kinney & Lange, P.A.

(57) ABSTRACT

A fluid level sensor system is disclosed for sensing a fluid level in a well. The system has a main body and an inlet housing coupled to the main body. The inlet housing has an internal chamber in communication with an ambient environment within the well. A bellows within the main body communicates with the internal chamber of the inlet housing. A movable element is responsive to movement of the bellows. A sensor detects when the movable element moves from a first position, indicating a first fluid level in the well, to a second position indicating a second fluid level within the well. An indicator is operably associated with the movable element and moves into a position to be viewable when the (Continued)

sensing element is moved to the second position, to provide a visual indication that the second fluid level has been reached.

16 Claims, 4 Drawing Sheets

(56)  References Cited

U.S. PATENT DOCUMENTS

| | | |
|---|---|---|
| 5,135,485 A | 8/1992 | Cohen et al. |
| 6,705,397 B2 | 3/2004 | Hershberger |
| 7,756,991 B2 | 7/2010 | Chen et al. |
| 8,735,856 B2 | 5/2014 | Lolla et al. |
| 2008/0271526 A1 | 11/2008 | Hewitt |
| 2012/0085945 A1 | 4/2012 | Lolla et al. |
| 2012/0096938 A1 | 4/2012 | Edwards |

FOREIGN PATENT DOCUMENTS

| | | | |
|---|---|---|---|
| CN | 103025995 A | | 4/2013 |
| CN | 204002755 U | | 12/2014 |
| CN | 104879123 A | | 9/2015 |
| CN | 105275454 A | | 1/2016 |
| GB | 1078270 | * | 8/1967 |
| KR | 10-2003-0091881 A | | 12/2003 |
| KR | 10-1721236 B1 | | 5/2012 |
| RU | 1809321 A1 | * | 4/1993 |
| WO | WO-9743604 A1 | * | 11/1997 ............ G01F 23/72 |
| WO | 2012003146 A2 | | 1/2012 |

OTHER PUBLICATIONS

International Search Report and Written Opinion of the ISA issued in PCT/US2018/058507, dated Feb. 15, 2019; ISA/KR.
First Chinese Office Action for CN Application No. 201880071404.6, dated Dec. 5, 2022, p. 21.

* cited by examiner

LIQUID LEVEL SENSOR SYSTEM

CROSS-REFERENCE TO RELATED APPLICATIONS

This application is a 371 U.S. National Phase of International Application No. PCT/US2018/058507, filed on Oct. 31, 2018, which claims the benefit of U.S. Provisional Patent Application No. 62/580,750, filed on Nov. 2, 2017. The entire disclosures of the above applications are incorporated herein by reference.

FIELD

The present disclosure relates to systems and methods for sensing fluid levels within wellbores in which pumps are used for de-watering and in which gas analyzers are used to measure the quality of gas, and more particularly to a system and method for sensing a fluid level within a wellbore and providing both an electronic and a visual signal of a high water condition within the wellbore.

BACKGROUND

This section provides background information related to the present disclosure which is not necessarily prior art.

With fluid pumps used in wellbores, and particularly groundwater pumps used in groundwater wells, it is important to be able to reliably detect when a condition has arisen where a water level within the wellbore has exceed a predetermined maximum threshold level. When such a condition occurs, the pump in the wellbore needs to be actuated, or a service/maintenance person needs to be notified that the fluid level in the wellbore has reached the predetermined maximum threshold level. Such a condition is highly important as it may signal that a fluid pump within the wellbore has stopped working. Conversely, when the fluid level in the wellbore drops to, or below, a predetermined lower threshold level, this condition needs to be sensed as well because it verifies that sufficient fluid has been pumped from the wellbore during a pump cycle.

While various systems for monitoring fluid levels in a wellbore have been practiced, for example see U.S. Pat. No. 7,756,991, assigned to the assignee of the present application, and the teachings of which are hereby incorporated by reference into the present disclosure, there still exists a need for a system and method which is able to reliably indicate when a predetermined fluid level threshold within the wellbore has been reached or exceeded, and which provides more than one type of signal indicating this condition.

SUMMARY

This section provides a general summary of the disclosure, and is not a comprehensive disclosure of its full scope or all of its features.

In one aspect the present disclosure relates to a fluid level sensor system for sensing a fluid level in a well. The system may comprise a main body and an inlet housing coupled to the main body, the inlet housing having an internal chamber in communication with an ambient environment within the well. A bellows may be disposed within the main body and in communication with the internal chamber of the inlet housing. A movable element may be included which is responsive to movement of the bellows. A sensor may also be included which is configured to sense a position of the movable element to detect when the movable element moves from a first position, indicating a first fluid level in the well, to a second position indicating a second fluid level within the well. An indicator may also be included which is operably associated with the movable element, and movable into position to be viewable when the sensing element is moved to the second position, to provide a visual indication that the second fluid level has been reached.

In another aspect the present disclosure relates to a fluid level sensor system for sensing a fluid level in a well. The system may comprise a main body and a transparent component operably associated with the main body. An inlet housing may be coupled to the main body, with the inlet housing having an internal chamber in communication with an ambient environment within the well. A bellows may be disposed within the main body and in communication with the internal chamber of the inlet housing. A shaft may be secured to the bellows and moveable linearly within the main body in accordance with expanding and contracting movement of the bellows. A magnet may be carried at one end of the shaft, and a stationary sensor may be configured to sense a changing magnetic flux generated by the magnet as the magnet moves from a first position, indicating a first fluid level in the well, to a second position indicating a second fluid level within the well. A housing may be included for housing the stationary sensor adjacent a path of travel of the magnet. An indicator may be operably associated with the shaft, and movable linearly into position to be viewable through the transparent component when the sensing element is moved to the second position, to provide a visual indication that the second fluid level has been reached.

In still another aspect the present disclosure relates to a method for sensing a fluid level in a well. The method may comprise using a bellows disposed within a housing component to sense a change in a fluid level within the well. The method may further include using the bellows to linearly move an element, the element including a magnet. The method may further include using a sensor disposed in a stationary position relative to the housing to sense a changing magnetic flux field generated by the magnet as the element is moved linearly in response to a changing fluid level within the well. The method may also include using an indicator responsive to movement of the magnet to provide a visual indication of the fluid level within the well.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings, in which.

DETAILED DESCRIPTION

Example embodiments will now be described more fully with reference to the accompanying drawings.

Figures 1, 2:
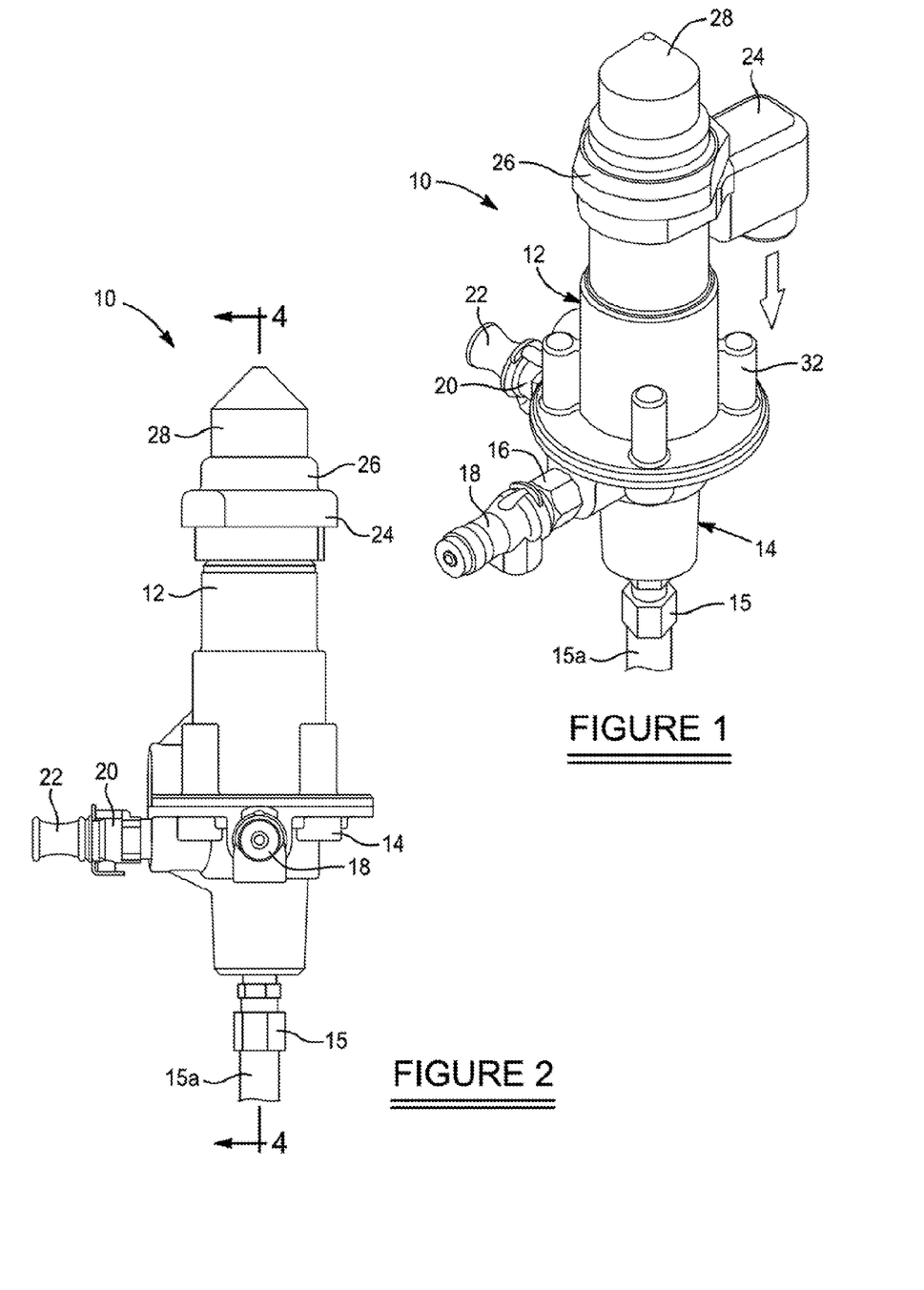
FIG. 1 is a perspective view of a liquid level sensing system in accordance with one embodiment of the present disclosure.
FIG. 2 is a side view of the liquid level sensing system of claim 1.
Figure 3:
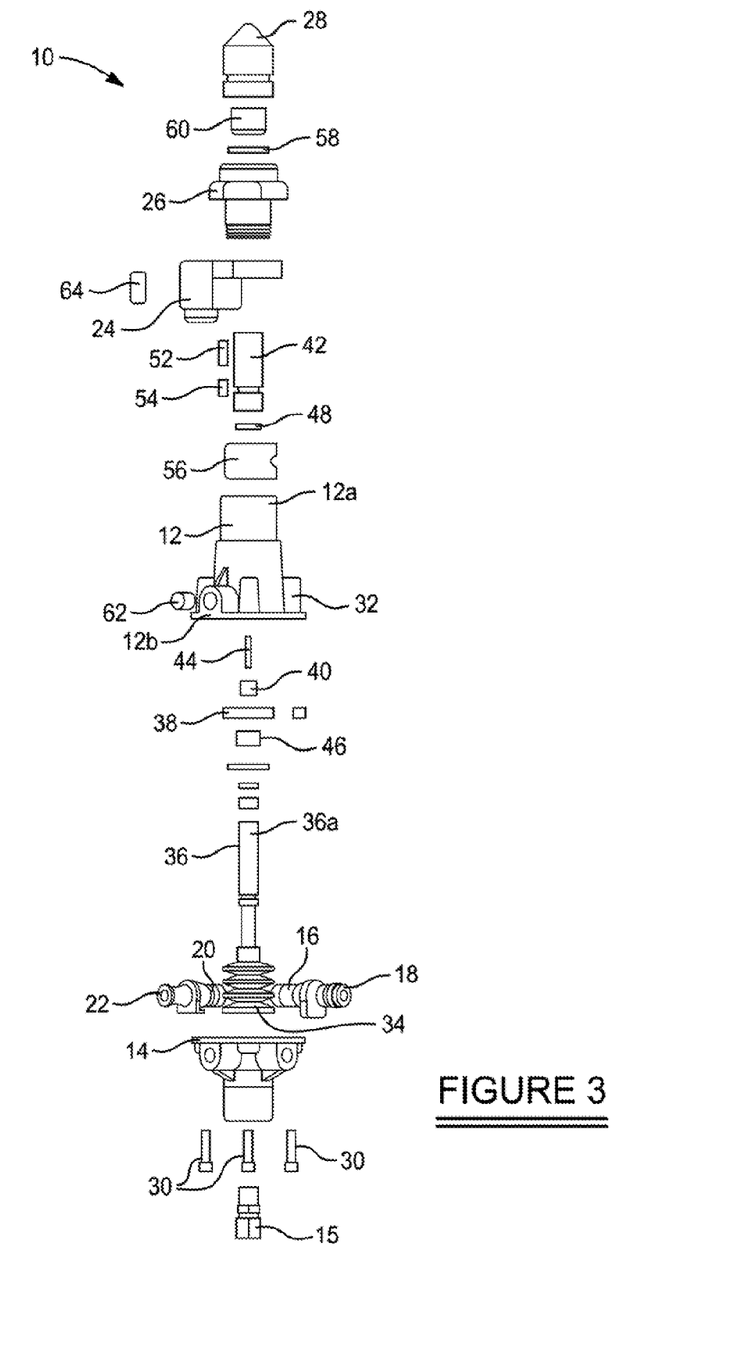
FIG. 3 is an exploded perspective view showing various components of the liquid level sensing system of FIGS. 1 and 2.

Referring to FIGS. 1-3, there is shown a liquid level sensing system 10 (hereinafter simply "system 10") in accordance with one embodiment of the present disclosure. It will be appreciated from the following discussion that while the system 10 is especially well suited for use with monitoring a water level in a groundwater well, the system 10 could be used to indicate the levels of other types of fluids being pumped from a well (e.g., gasoline), and is therefore not limited to use in only groundwater wells.

The system 10 in this example may include a main body housing 12 coupled to an inlet housing 14. The housing 12 may be supported at a wellhead (not shown) with which the system 10 is being used. The inlet housing 14 may be coupled to a connector 15 which is secured to tube 15a, which extends into a groundwater well (not shown) in which a groundwater pump (not shown) is located. An air fitting 16 is coupled to a port in the inlet housing 14 and receives, via a threaded connection, a coupling 18. The coupling 18 may form a port which can be used to couple to a gas meter or a pressure meter, or even to hook a bubbler type of level measuring device. An air fitting 20 is also coupled to the inlet housing and receives a plug 22. When the plug 22 is removed, the air fitting 20 may be used to help sample well gas for quality purposes.

FIGS. 1 and 2 further illustrate the system 10 including a switch holder housing 24. A mounting dome 26, which may be a molded plastic component, is coupled to the main body housing 12 adjacent the switch holder housing 24. A transparent dome 28, may also be molded from plastic, and is secured to the mounting dome 26. The function of the transparent dome 28 will be discussed in detail momentarily. While the holder housing 24 and the mounting dome 26 are shown as two independent components, it will be appreciated that these two components may be manufactured as a single component if desired. Both embodiments are contemplated by the present disclosure.

Figure 4:
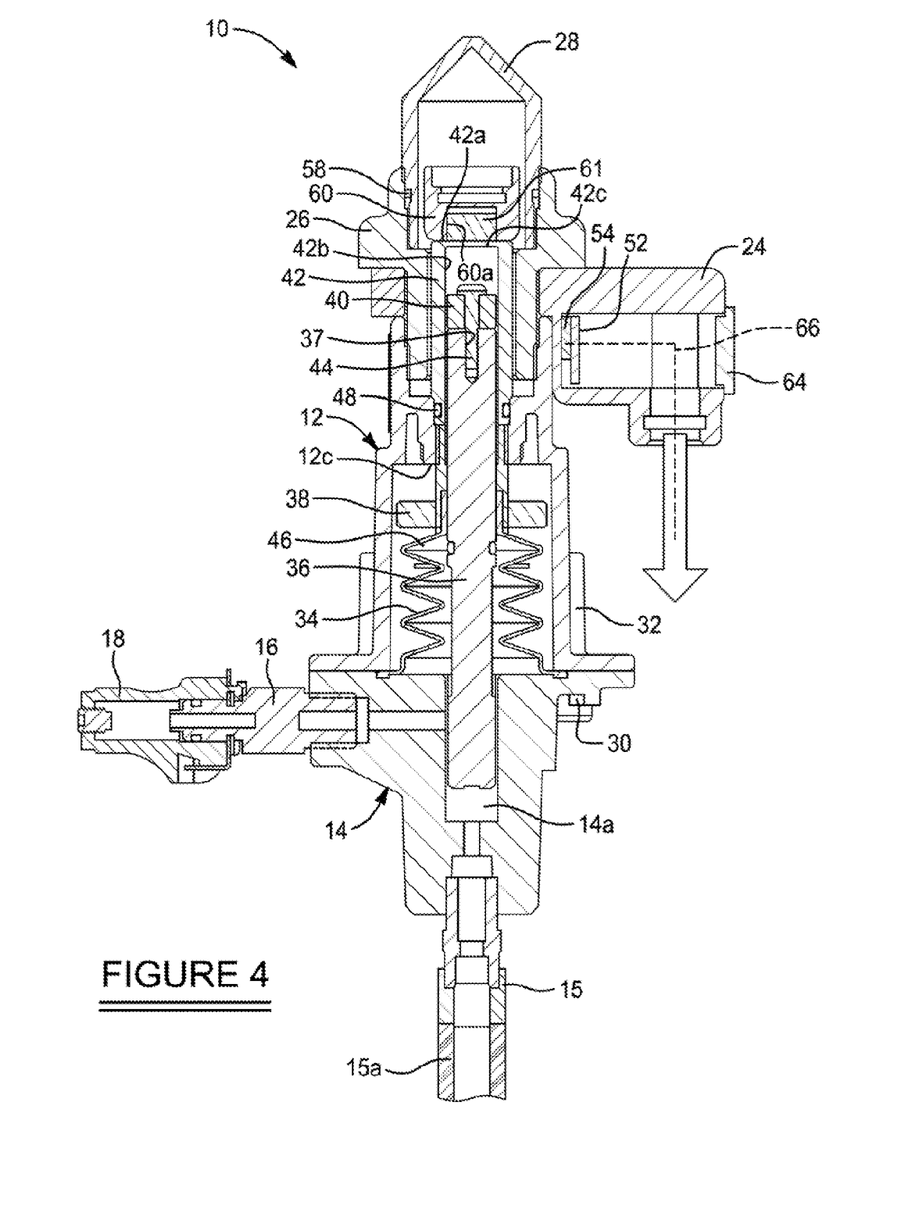
FIG. 4 is a side cross sectional view taken in accordance with section line 4-4 in FIG. 1 illustrating an internal magnet of the liquid level sensing system in a first position, indicating an internal water level within a groundwater well at which the system is being used being at or below a lower predetermined threshold level.

Referring to FIGS. 3 and 4, internal components of the system 10 can be seen in greater detail. A plurality of threaded screws 30 extend through openings (not shown) in the inlet housing 14 and into threaded bosses 32 of the main body housing 12 to secure these components together. A bellows 34 is positioned within the inlet housing 14 and main body housing 12 and is operably coupled to a shaft 36 such that linear expanding movement of the bellows 34 causing a corresponding linear movement of the shaft 36. An annular stop element 38 is positioned within the main body housing 12 and serves as an upper limit stop for movement of the bellows 34 while permitting linear movement of the post within the main body housing 12. A magnet 40 is positioned for linear sliding movement within a post 42, with the post 42 being fixedly positioned within the main body housing 12. The magnet 40 is secured via a threaded screw 44 to a blind threaded hole 37 in the shaft 36, which in turn rests against an upper end 36a of the shaft 36. O-ring 48 helps to provide a fluid tight seal between the exterior surface of the post 42 and the interior surface of the main body housing 12.

With further reference to FIGS. 3 and 4, a reed switch mounting plate 52 helps to hold a switch, which may be a normally open ("NO") reed switch 54 (but which could also be a "normally closed" switch) in position within the switch holder housing 24 to sense a magnetic flux field of the magnet 40 when the magnet is in a first linear position within the mounting dome 26. Optionally an adhesive label 56 may be applied over a portion 12a of the main body housing 12 to indicate a manufacturer of the system 10. An O-ring 58 may be disposed between an external surface of the transparent dome 28 and an internal surface of the mounting dome 26 to create a fluid tight seal between these surfaces. A colored indicator element 60 may be positioned against an upper surface 42a of the post 42. The colored indicator has a recess 60a in which a magnet 61 is permanently affixed, such as by adhesives or a conventional threaded fastener. The magnet 61 is oriented relative to the magnet 40 such that the magnet poles of the two magnets produce a flux field that wants to repel the magnets away from one another, or put differently, to maintain the spacing between the two magnets as shown in FIG. 4.

Figure 5:
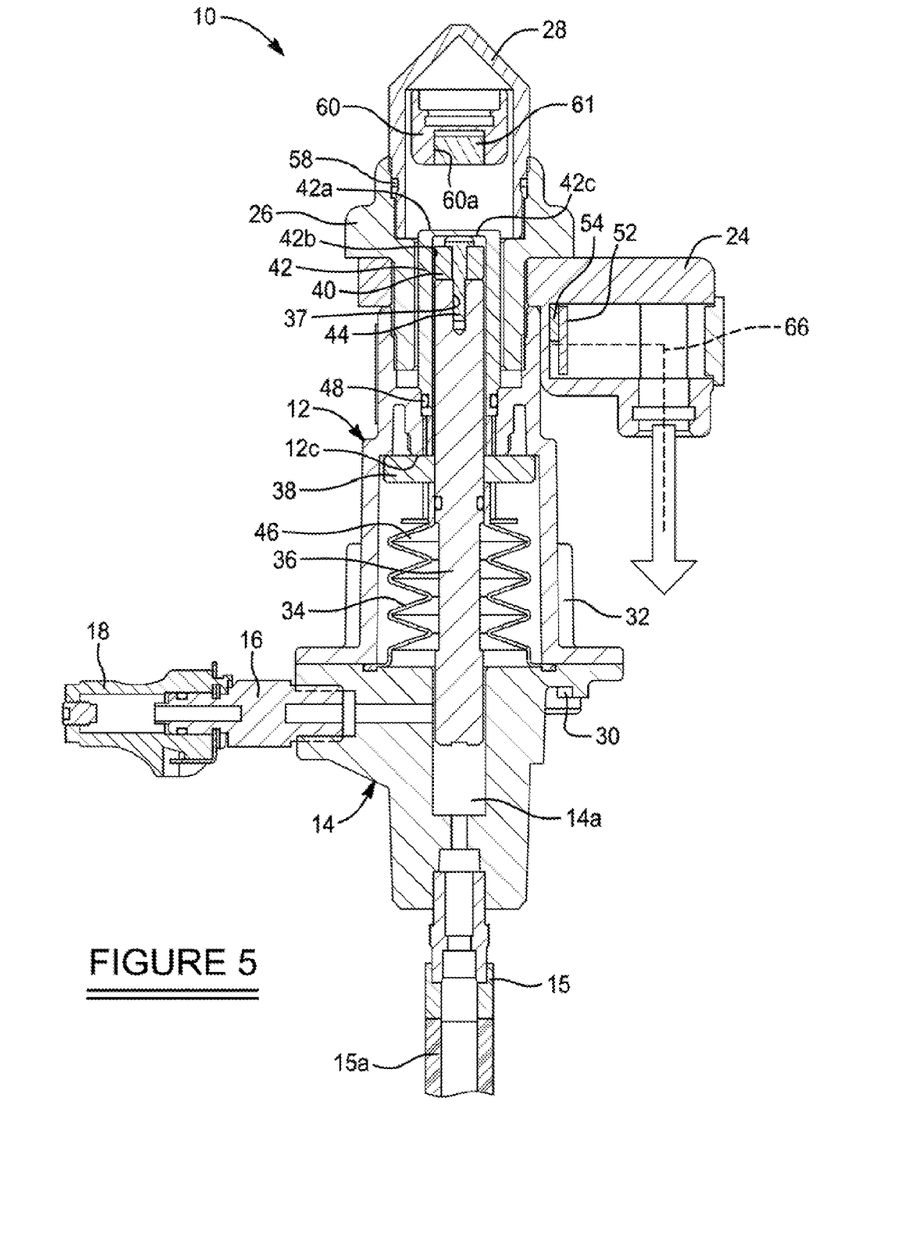
FIG. 5 is view of the system shown in FIG. 4 but with the magnet having risen to its uppermost position indicating that the fluid level has reached or exceeded the maximum predetermined threshold level.

As shown in FIG. 5, when the bellows 34 has expanded linearly to an upper threshold point, indicating that fluid within the well has risen to the upper predetermined threshold limit within the well bore, the colored indicator 60 upwardly into position where it can be easily visually seen by an individual. A plug 62 may be threaded into a threaded hole 12b in the main body to close off the threaded hole. The threaded hole 12b allows well gas pressure to be presented to the interior of the main body housing 12. A cap 64 may be used to close off an access opening (not visible in the Figure) which helps with positioning of the magnet 40 during assembly.

When the magnet 40 of the system 10 is in its first or lower position as shown in FIG. 4, the reed switch 54 will sense the magnetic flux field produced by the magnet and provide a signal in accordance therewith over electrical conductor(s) 66. This electrical signal may be sent to external electronic devices such as a controller or processor, which may be used to monitor the fluid level in the well bore. When the fluid level in the well bore rises, this displaces air within the tube 15a upwardly, which results in pressure building up within a chamber 14a formed within the inlet housing 14. When the pressure overcomes the combined weight of the shaft 36, the magnet 40, the threaded screw 44, the stop member 38 and the biasing resistance of the bellows 34, this will begin lifting the shaft 36 upwardly in the drawings of FIGS. 4 and 5. The magnet 40 will rise within bore 42b of the post 42 as the pressure acting on the shaft 36 continues to increase, until the stop member 38 contacts internal wall 12c within the main body housing 12, as shown in FIG. 5. At this point the magnet 40 will have changed position, and the stationary reed switch 54 will be closely adjacent internal wall 42c of the post 42, and will no longer sense the magnetic flux field of the magnet 40, or may be sensing a significantly reduced magnetic flux field. In either case, this causes a change in the signal being provided from the reed switch 54 on electrical conductor(s) 66. This change in signal may be used by an external processor or controller to determine that the fluid level within the well has reached the predetermined upper threshold level. Substantially simultaneously with the signal on the electrical conductor(s) 66 changing, the linear vertical movement of the shaft 36 will result in the repulsive magnetic flux field between the magnets 40 and 61 causing a corresponding linear vertical movement of the colored indicator element 60 upwardly toward a top area of the transparent dome 28, as shown in FIG. 5. This places the colored indicator member 60 in position to be visually viewed by an individual who may be monitoring the system 10. The colored indicator element 60 thus provides a backup visual signal that the fluid level in the well bore has reached the predetermined upper threshold level.

The system 10 thus is able to provide two distinct and different types of signals, one being an electrical signal and the other being a visual signal, that the upper predetermined threshold level fluid has been reached by the fluid in the well bore. Accordingly, if by some remote chance the colored indicator member 60 has become stuck in its upper position, but the electrical signal from the reed switch 54 is indicating that the reed switch is still sensing the magnetic flux field from the magnet 40 (thus indicating that the maximum predetermined threshold level has not been reached by fluid in the well bore), this information can be used by a service/maintenance technician to look into the sensing system 10 more thoroughly before removing the pump from the well bore. Conversely, if the reed switch 54 is indicating by its electrical signal that the maximum predetermined threshold has been reached, but the colored indicator has not risen to the point of being visible within the transparent dome 28, this information can also be used by the service/maintenance technician in looking more closely at the system 10 before removing the pump from the well bore. It will also be appreciated that a Hall Effect Sensor (HES), which gives a variable output as the flux field changes in front of the sensor, may optionally be included in the system 10. So now the HES provides a signal that the state has changed, which enables the system 10 to provide information on the rate at which the fluid level within the well bore is changing, as well as when the change in level begins to occur.

It will also be appreciated that the output signal being provided by the reed switch 54 may be coupled to an external subsystem/circuit (not shown) that applies ratiometric sensing techniques to even better gauge the liquid level within the well bore. By "ratiometric sensing" it is meant evaluating a change in the magnetic flux signal provided from the reed switch 54 on electrical conductor(s) 66, and from the change extrapolating a percentage by which the liquid level has risen (e.g., 25%, 50%, etc.). Accordingly, this optional subsystem may provide a service/maintenance technician with even further advance warning that the fluid level with the wellbore is beginning to rise, but has not yet risen to the predetermined maximum threshold level.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fluid level sensor system for sensing a fluid level in a well, the system comprising:
a main body;
an inlet housing coupled to the main body, the inlet housing having an internal chamber in communication with an ambient environment within the well;
a bellows disposed within the main body and in communication with the internal chamber of the inlet housing;
a shaft operatively connected to the bellows to move linearly along an axis in accordance with expanding and contracting movement of the bellows;
a movable element responsive to movement with the bellows and moveable in accordance with movement of the bellows, the movable element including a first magnet mounted on the shaft such that the first magnet moves linearly with the shaft, the first magnet disposed in a first chamber;
an external switch housing connected adjacent to the main body, the external switch housing containing a stationary sensor, the stationary sensor configured to sense a position of the first magnet to detect when the first magnet moves from a first position, indicating a first fluid level in the well, to a second position indicating a second fluid level within the well; and
an indicator operably associated with the first magnet, and movable into position to be viewable when the first magnet is moved to the second position, to provide a visual indication that the second fluid level has been reached, the indicator including a second magnet aligned axially with the first magnet and disposed directly above the first chamber, the indicator configured such that the first magnet repulses the second magnet to shift the indicator to indicate a change in the fluid level.

2. The system of claim 1, wherein the stationary sensor comprises at least one of a reed switch and a Hall Effect Sensor (HES).

3. The system of claim 1, wherein the sensor comprises a reed switch positioned adjacent a path of movement of the magnet as the magnet moves between the first and second positions.

4. The system of claim 1, wherein the sensor comprises a sensor configured to sense a magnetic flux field generated by the magnet.

5. The system of claim 4, wherein the sensor comprises a reed switch.

6. The system of claim 1, wherein the inlet housing further includes an air fitting in communication with the internal chamber.

7. The system of claim 1, further including a post positioned within the main body for receiving a portion of the shaft therein and guiding linear movement of the shaft.

8. The system of claim 7, further comprising an O-ring for providing a seal between an external surface of the post and an internal surface of the main body.

9. The system of claim 1, wherein the sensor comprises a sensor configured to sense a changing flux field produced by the magnet as the magnet moves between the first and second positions.

10. The system of claim 1, further comprising:
a mounting dome operably associated with the inlet housing for housing the indicator; and
a transparent dome coupled to the mounting dome, the indicator being visible when the indicator is moved into a position adjacent the transparent dome.

11. A fluid level sensor system for sensing a fluid level in a well, the system comprising:
a main body;
a transparent component operably associated with the main body;
an inlet housing coupled to the main body, the inlet housing having an internal chamber in communication with an ambient environment within the well;
a bellows disposed within the main body and in communication with the internal chamber of the inlet housing;
a shaft secured to the bellows and moveable linearly along an axis and within the main body in accordance with expanding and contracting movement of the bellows;
a first magnet carried at one end of the shaft and disposed in a first chamber, the first magnet movable with the shaft between a first position and a second position;
a stationary sensor configured to sense a changing magnetic flux generated by the first magnet as the first magnet moves from a first position, indicating a first fluid level in the well, to a second position indicating a second fluid level within the well;
a housing for housing the stationary sensor adjacent a path of travel of the magnet; and
an indicator operably associated with the shaft, and movable linearly into position to be viewable through the transparent component when the first magnet is moved to the second position, to provide a visual indication that the second fluid level has been reached, the indicator including a second magnet;
wherein the second magnet is disposed above the first chamber and aligned linearly with the first magnet, the second magnet configured to be repulsed by the first magnet, the second magnet positioned such that the second magnet is disposed outside of the first chamber and is supported by a wall at least partially defining the first chamber with the first magnet in the first position, and the second magnet configured such that the second magnet is repulsed by the first magnet and the indicator is shifted to indicate change in the fluid level with the first magnet in the second position.

12. The system of claim 11, wherein the sensor comprises a reed switch.

13. The system of claim 11, further comprising a post disposed within the main body for guiding movement of the shaft as the bellows expands and contracts.

14. The system of claim 11, wherein the inlet housing includes a fitting in communication with the internal chamber for enabling coupling with an external gas meter or pressure meter.

15. The system of claim 11, further comprising:
a mounting dome coupled to the inlet housing;
the transparent component including a transparent dome coupled to the mounting dome; and
wherein the housing for housing the stationary sensor is coupled between portions of the mounting dome and the main body.

16. A method for sensing a fluid level in a well, the method comprising:
using a bellows disposed within a housing component to sense a change in a fluid level within the well;
using the bellows to linearly move an element along an axis, the element including a first magnet disposed in a first chamber;
using a sensor disposed in a stationary position relative to the housing to sense a changing magnetic flux field generated by the magnet as the element is moved linearly in response to a changing fluid level within the well; and shifting an indicator, the indicator including a second magnet disposed in a second chamber directly axially above the first chamber, by the first magnet repulsing the second magnet to displace the indicator linearly along the axis to provide an indication of the fluid level within the well.

* * * * *